US012043518B1

(12) United States Patent
Duvall

(10) Patent No.: US 12,043,518 B1
(45) Date of Patent: Jul. 23, 2024

(54) TENSION EQUALIZING TRACTION SHEAVE ASSEMBLY FOR ELEVATOR ASSEMBLIES

(71) Applicant: TK Elevator Innovation and Operations GmbH, Duesseldorf (DE)

(72) Inventor: Jeffrey Shawn Duvall, Smyrna, GA (US)

(73) Assignee: TK Elevator Innovation and Operations GmbH, Duesseldorf (DE)

( * ) Notice: Subject to any disclaimer, the term of this patent is extended or adjusted under 35 U.S.C. 154(b) by 0 days.

(21) Appl. No.: 18/227,607

(22) Filed: Jul. 28, 2023

(51) Int. Cl.
*B66B 15/04* (2006.01)

(52) U.S. Cl.
CPC .................................... *B66B 15/04* (2013.01)

(58) Field of Classification Search
CPC ....... B66B 15/04; B66B 11/008; B66B 11/08; B66B 11/06; B66B 11/04
See application file for complete search history.

(56) References Cited

U.S. PATENT DOCUMENTS

2017/0217731 A1 8/2017 Liebetrau
2019/0047826 A1* 2/2019 Lee ........................ B66B 15/04
2019/0106295 A1* 4/2019 Salmi ....................... B66D 3/08
2019/0263631 A1* 8/2019 Duvall ..................... F16H 55/50
2020/0055706 A1* 2/2020 Chang ...................... B66B 15/04
2020/0071134 A1* 3/2020 Helenius ................. B66B 11/08
2020/0377338 A1* 12/2020 Wölfel .................. B66B 11/043

FOREIGN PATENT DOCUMENTS

DE 102017206131 A1 * 10/2018 ............ B66B 11/08
KR 20200057904 A * 5/2020

* cited by examiner

*Primary Examiner* — Diem M Tran
(74) *Attorney, Agent, or Firm* — Dinsmore & Shohl LLP

(57) ABSTRACT

Embodiments herein are directed to a traction sheave assembly that includes an actuator, a shaft, at least one meshing gear, a first sheave segment, and a second sheave segment. The shaft includes a first portion and a second portion separated by a collar. At least one spoke extends from an outer surface of the collar. The at least one meshing gear is received by a respective one of the at least one spoke. The first sheave segment has a first sheave receiving gear that engages with the at least one meshing gear. The second sheave segment has a second sheave receiving gear that engages with the at least one meshing gear. The first sheave segment and the second sheave segment rotate independently to have a motion independent from one another when the shaft is rotated to equalize a tension between the suspension members.

20 Claims, 5 Drawing Sheets

TENSION EQUALIZING TRACTION SHEAVE ASSEMBLY FOR ELEVATOR ASSEMBLIES

TECHNICAL FIELD

The present specification generally relates to a traction sheave assembly and, more specifically, to traction sheave segments of a traction sheave assembly.

BACKGROUND

It is known to use a plurality of suspension members, such as hoisting belts, or hoisting ropes, attached to an elevator cab of an elevator system to move the elevator cab between floors of a building within an elevator shaft or hoistway. Each of the plurality of suspension members are received within respective grooves of a traction sheave, which is coupled to a motor to rotate the traction sheaves and the plurality of suspension members. Tension equalization between each of the plurality of suspension members can be challenging due to, for example, various geometry variations in the grooves based on machining differences. As each of the sheave segments rotate many times over the entire travel of the elevator cab, these small variations in the individual groove circumferences from one groove to the next add up to significant differences in the total travel for each suspension member. Such variations cause each suspension member of the plurality of suspension members to experience large changes in tension relative to one another.

SUMMARY

A traction sheave assembly is provided. The traction sheave assembly includes an actuator, a shaft, at least one meshing gear, a first sheave segment, and a second sheave segment. The shaft includes a distal end and a proximate end. The proximate end is in communication with the actuator to rotate the shaft upon an actuation of the actuator. The shaft further has a first portion and a second portion positioned between the distal end and the proximate end and separated by a collar. At least one spoke extends from an outer surface of the collar. The at least one meshing gear is received by a respective one of the at least one spoke that extends from the outer surface of the collar. The first sheave segment is positioned to receive the first portion of the shaft. The first sheave segment has a first sheave receiving gear that engages with the at least one meshing gear. The second sheave segment is positioned to receive the second portion of the shaft. The second sheave segment has a second sheave receiving gear that engages with the at least one meshing gear. The first sheave segment and the second sheave segment rotate independently relative to one another when the shaft is rotated thereby permitting an equalizing of a tension from at least one suspension member.

A traction sheave assembly for equalizing a tension of a plurality of suspension members of an elevator assembly is provided. The elevator assembly includes an elevator cab positioned within a hoistway. The plurality of suspension members move the elevator cab between a plurality of positions within the hoistway between the plurality of positions. The traction sheave assembly includes a motor, a shaft, at least one meshing gear, a first sheave segment, and a second sheave segment. The shaft has a distal end and a proximate end. The proximate end is in communication with the motor to rotate the shaft upon an actuation of the motor. The shaft further includes a first portion and a second portion positioned between the distal end and the proximate end and separated by a collar. At least one spoke extends from an outer surface of the collar. At least one meshing gear is received by a respective one of the at least one spoke that extends from the outer surface of the collar. The first sheave segment is positioned to receive the first portion of the shaft. The first sheave segment has a first sheave receiving gear that engages with the at least one meshing gear. The second sheave segment is positioned to receive the second portion of the shaft. The second sheave segment has a second sheave receiving gear that simultaneously engages with the at least one meshing gear. The first sheave segment and the second sheave segment rotate independently relative to one another when the shaft is rotated thereby equalizing a tension between at least one of the plurality of suspension members and the remaining plurality of suspension members.

A traction sheave assembly for an elevator assembly that has at least two suspension members is provided. The traction sheave assembly includes an actuator, a shaft, at least one meshing gear, a first sheave segment, and a second sheave segment. The shaft has a distal end and a proximate end. The proximate end is in communication with the actuator to rotate the shaft upon an actuation of the actuator. The shaft further has a first portion and a second portion positioned between the distal end and the proximate end and is separated by a collar. At least one spoke extends from an outer surface of the collar. At least one meshing gear is received by a respective one of the at least one spoke that extends from the outer surface of the collar. The first sheave segment is positioned to receive the first portion of the shaft. The first sheave segment has a first sheave receiving gear that engages with the at least one meshing gear and at least one groove positioned within an exterior surface that receives one suspension member of the at least two suspension members. The first sheave segment has a first terminating end and an opposite first gear end. The first sheave receiving gear is integrated into the first gear end. The first sheave segment further has at least one annular recess positioned between the first gear end and the first terminating end and is configured to receive at least one first bearing. The second sheave segment is positioned to receive the second portion of the shaft. The second sheave segment has a second sheave receiving gear that engages with the at least one meshing gear and at least one groove positioned within an exterior surface that receives the other one suspension member of the at least two suspension members. The second sheave segment has a second terminating end and an opposite second gear end. The second sheave receiving gear is integrated into the second gear end. The second sheave segment further has at least one annular recess positioned between the second gear end and the second terminating end and is configured to receive at least one second bearing. The first sheave segment and the second sheave segment rotate independently relative to one another when the shaft is rotated thereby equalizing a tension from at the one suspension member in contact with the first sheave segment and a tension from at the other one suspension member in contact with the second sheave segment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to improved traction sheaves in elevator assemblies that includes independent movable traction sheave segments to permit relative motion between each of the movable sheave segments to equalize a tension of different suspension members in contact with each of the movable traction sheave segments. Such embodiments improve conventional systems where the traction sheave segments are coupled together and move in a unitary manner (e.g., move together as a single monolithic structure). Embodiments described herein permit the independent traction sheave segments to turn independently from one another as needed while still being mechanically related to each other such that a transmission of torque to the elevator system is permitted to drive or move an elevator cab.

In some embodiments, the traction sheave assembly includes a shaft having a distal end and an opposite proximate end. The proximate end is in communication with an actuator or motor to rotate the shaft upon an actuation. The shaft further includes a first portion and a second portion positioned between the distal end and the proximate end and which are separated by a collar. At least one spoke extends from an outer surface of the collar. At least one meshing gear is received by a respective one of the at least one spoke that extends from the outer surface of the collar. A first sheave segment is positioned to receive the first portion of the shaft. The first sheave segment has a first sheave receiving gear that engages with the at least one meshing gear. A second sheave segment is positioned to receive the second portion of the shaft. The second sheave segment has a second sheave receiving gear that engages with the at least one meshing gear. Each of the traction sheave segments rotate independently from one another to have a motion independent from one another when the shaft is rotated thereby equalizing a tension of at least one suspension member. As such, the shaft transmits torque into the system and, because of the arrangement of the meshing gear, the first sheave receiving gear, and the second sheave receiving gear, each of the traction sheave segments are able to rotate independently, if needed and because traction is maintained, the input torque will drive the system as intended.

Various embodiments of the traction sheave assembly are described in detail herein.

Figure 1A:
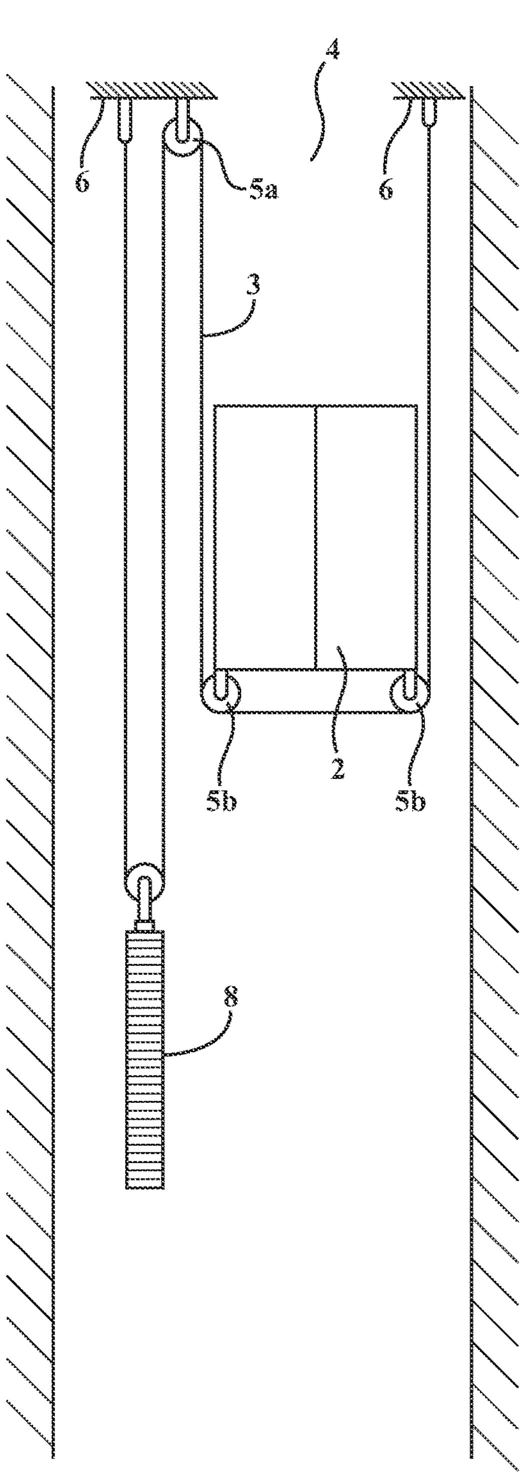
FIG. 1A schematically depicts a first aspect of an elevator assembly schematic, according to one or more embodiments shown and described herein.

Referring now to FIG. 1A, an elevator assembly schematic that illustrates various components for a first aspect of an elevator assembly 1 is depicted. In this aspect, the elevator assembly 1 may include an elevator cab 2, a plurality of suspension members 3 illustrated for schematic reasons as a single suspension member, a hoistway 4 or elevator shaft, a traction sheave assembly 5*a*, a pair of idler sheaves 5*b*, a rail cap 6 and a counterweight 7. In this aspect, the plurality of suspension members 3 extend a length between two different rail caps 6. Further, in this aspect, the traction sheave assembly 5*a*, for example, is mounted to the rail cap 6 positioned in an upper portion of the hoistway 4 above the elevator cab 2 in a vertical direction (i.e., in the +/−Z direction). This is non-limiting, and the traction sheave assembly 5*a* may be mounted anywhere within the hoistway 4 and there may be more than one traction sheave assembly 5*a*.

The traction sheave assembly 5*a* may include a motor 12 (FIG. 2), or actuator, such that the traction sheave assembly 5*a* is a device to drive the plurality of suspension members 3 through a plurality of lengths between the elevator cab 2 and the traction sheave assembly 5*a* by rotating a shaft 14 (FIG. 2), as discussed in greater detail herein. The idler sheaves 5*b* may also be mounted at various positions in the hoistway 4, and, in this aspect, are also coupled to the elevator cab 2. The idler sheaves 5*b* are passive (they do not drive the plurality of suspension members 3 but rather guide or route the plurality of suspension members 3) and form a contact point, or engagement point, with the elevator cab 2. The plurality of suspension members 3 and the traction sheave assembly 5*a* move the elevator cab 2 between a plurality of positions within the hoistway 4.

That is, the plurality of suspension members 3, and/or other components known to those skilled in the art, may be configured to move the elevator cab 2 between a plurality of positions. For example, in some embodiments, the plurality of suspension members 3 may raise and lower the elevator cab 2 in a vertical direction (i.e., in the +/−Z direction) between floors in a building. In other embodiments, the plurality of suspension members 3 may move the elevator cab 2 in a lateral direction (i.e., in the +/−X direction), a longitudinal direction (i.e., in the +/−Y direction), or a direction transverse to one or more of the vertical, lateral or longitudinal directions, between a plurality of positions.

The elevator cab 2 may include a door, a gate, a barrier, or the like, that moves between an open position and a closed position. In the open position, a user may enter or exit the elevator cab 2. In the closed position, access may be denied to enter or exit the elevator cab 2. The elevator assembly 1 may act similarly to a traditional elevator assembly. That is, in some embodiments, the elevator cab 2 may move from one floor to another floor under the power of the motor 12 applied to the traction sheave assembly 5*a*, the plurality of suspension members 3, and other components.

As illustrated in FIG. 1A, the elevator assembly 1 is an underslung system. That is, each of the plurality of suspension members 3 may be movably coupled to the traction sheave assembly 5*a* and a portion of the suspension members 3 may be coupled to a bottom surface of the elevator cab 2 to suspend the elevator cab 2 via the idler sheaves 5*b*. As such, the suspension members 3 pass under the elevator cab 2 on a bottom of the elevator cab 2 via the idler sheaves 5*b* and are coupled to a dead end hitch or the rail cap 6 at the top of the hoistway 7 under tension.

Due to routing of the plurality of suspension members 3 there is a tension onort each of the plurality of suspension members 3. This tension may vary between each of the plurality of suspension members 3 due to machining tolerances of the grooves machined within traction sheave segments, friction differences between each of the plurality of suspension members 3, and/or the like, as discussed in greater detail herein.

Figure 1B:
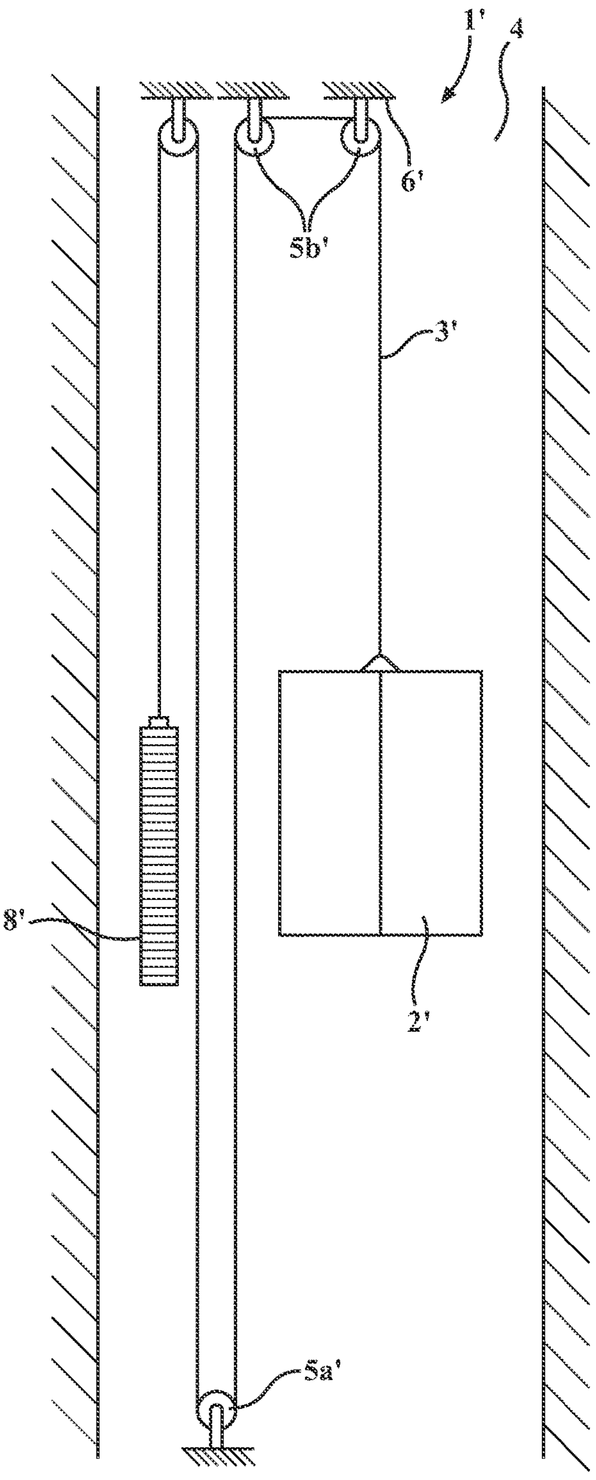
FIG. 1B schematically depicts a second aspect of an elevator assembly schematic, according to one or more embodiments shown and described herein.

Referring now to FIG. 1B, a schematic illustrates various components for a second aspect of an elevator assembly 1' is depicted. In this aspect, the elevator assembly 1' may include an elevator cab 2', a plurality of suspension members 3' illustrated for schematic reasons as a single suspension member, a hoistway 4' or elevator shaft, a traction sheave assembly 5*a*', a pair of idler sheaves 5*b*', a rail cap 6' and a counterweight 8'. In this aspect, the plurality of suspension members 3' extend a length between the counterweight 8' and the elevator cab 2'. Further, in this aspect, the traction sheave assembly 5*a*', for example, is mounted to a lower surface of the hoistway 4', This is non-limiting, and the traction sheave assembly 5*a*' may be mounted anywhere within the hoistway 4' and there may be more than one traction sheave assembly 5*a*'. The traction sheave assembly 5*a*' may include a motor 12 (FIG. 2) such that the traction sheave assembly 5*a*' is a device to drive the plurality of suspension members 3' through a plurality of lengths with respect to the length between the traction sheave assembly 5*a*' and the contact point of the elevator cab 2'. The idler sheaves 5*b*' may also be mounted at various positions in the hoistway 4', and, in this aspect, are also coupled to a rail cap 6'. The idler sheaves 5*b*' are passive (they do not drive the plurality of suspension members 3 but rather guide or route the plurality of suspension members 3').

It should be appreciated that the illustrated schematics of FIGS. 1A-1B are merely examples and that the suspension members routing may be vary significantly or slightly from these illustrated schematics. For example, there may be several idler sheaves positioned in the hoistway between the traction sheave and the contact point with the elevator cab. However, regardless of the suspension member routing and the number of components (e.g. idler sheaves) the length of each suspension member as used herein is between the traction sheave and the contact point with the elevator cab.

Figure 2:
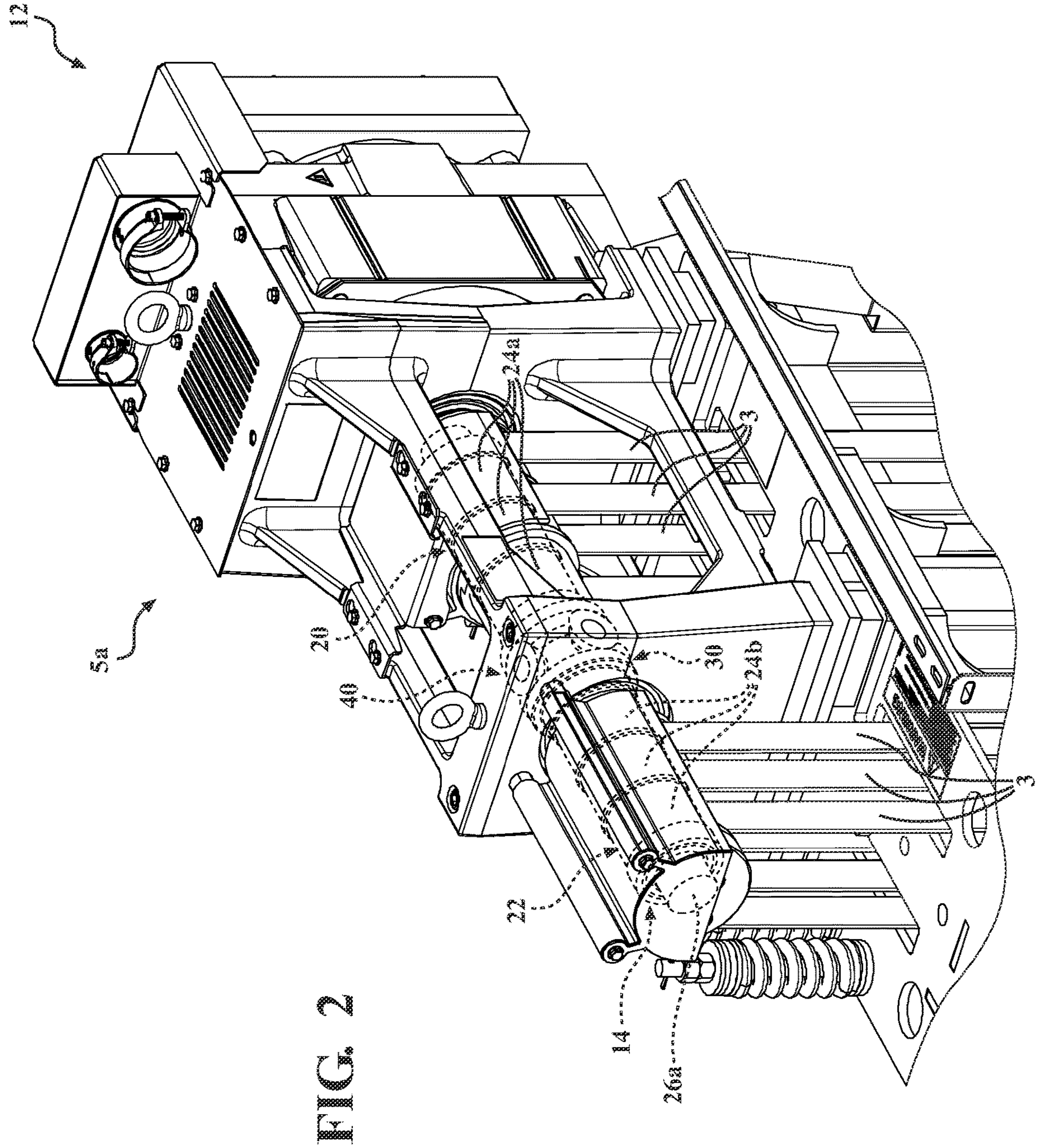
FIG. 2 schematically depicts a partial environmental view of a traction sheave assembly of the first aspect of the elevator assembly of FIG. 1A, according to one or more embodiments shown and described herein.
Figure 3:
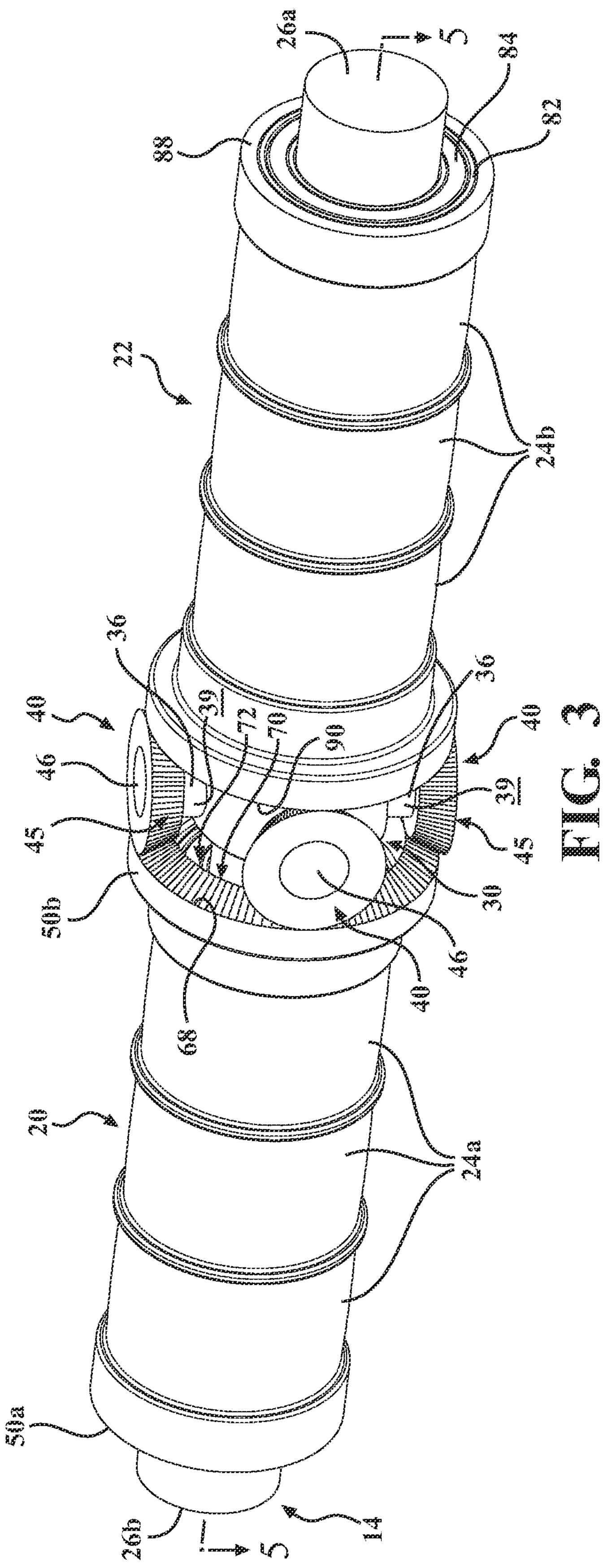
FIG. 3 schematically depicts a partial isolated perspective view of a traction sheave segments, shaft, collar and meshing gears from the traction sheave assembly of FIG. 2, according to one or more embodiments shown and described herein.
Figure 4:
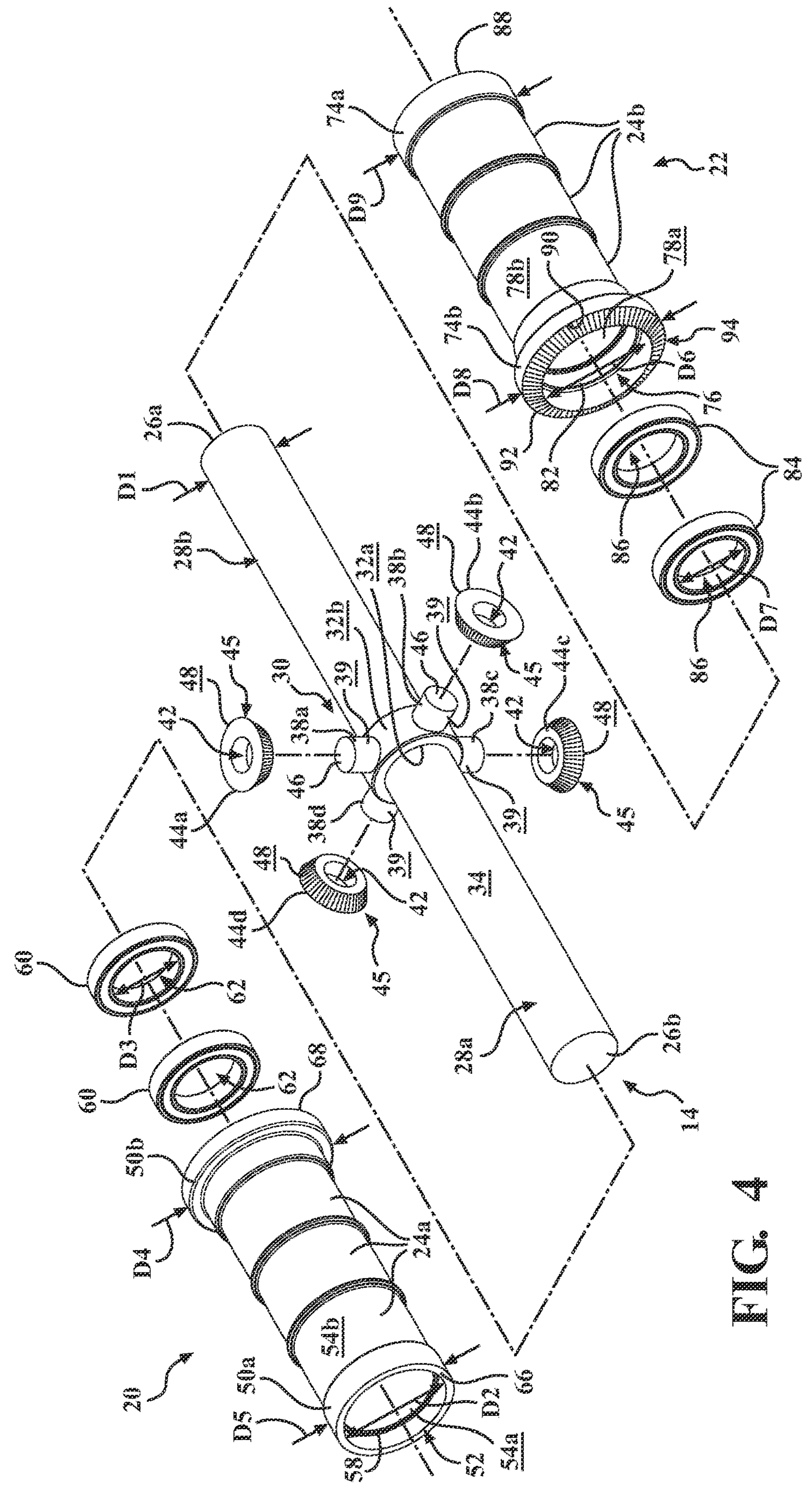
FIG. 4 schematically depicts an exploded view of the traction sheave segments, shaft, collar and meshing gears of FIG. 3, according to one or more embodiments shown and described herein.
Figure 5:
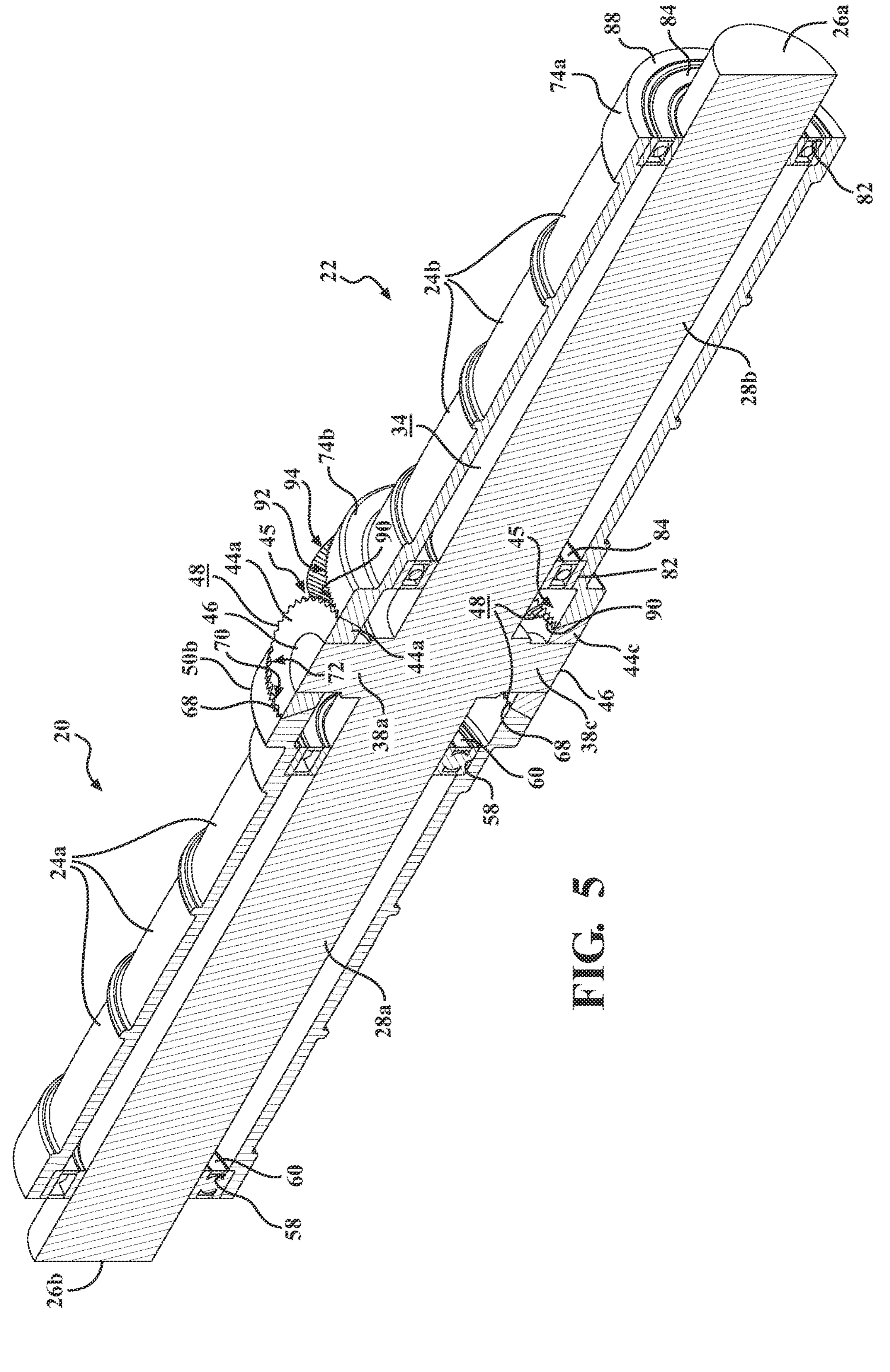
FIG. 5 schematically depicts a cross sectional view of the traction sheave segments, shaft, collar and meshing gears of FIG. 3 taken from lines 5-5, according to one or more embodiments shown and described herein.

Referring now to FIGS. 1A and 2, in which FIG. 2 schematically depicts a partial environmental view of the traction sheave assembly 5*a* of the elevator assembly 1 of FIG. 1A. For brevity reasons, embodiments described herein are directed to the elevator assembly 1 of FIG. 1A, however, it should be appreciated that this is non-limiting and embodiments may be directed to the elevator assembly 1' of FIG. 113, and/or other elevator assemblies not illustrated herein.

In some embodiments, the plurality of suspension members 3 may include any number of suspension members, such as six spaced-apart suspension members (e.g., two sets of three) as depicted in FIG. 2. In other embodiments, there may be more or less than six spaced apart suspension members. Upon an actuation of the motor 12, or actuator, the suspension members 3 are under a tension against the traction sheave assembly 5A to move the plurality of suspension members 3, which in turn move the elevator cab 2 between various landings. That is, in operation, a rotation of the traction sheave assembly 5*a* moves the plurality of suspension members 3 through the idler type sheaves 5*b*, which in turn together move the elevator cab 2 between landings. In some embodiments, the movement of the suspension members 3 is in the vertical direction (i.e., in the +/−Z direction). In other embodiments, the movement of the suspension members 3 is in the longitudinal direction (i.e., in a +/−Y direction) and/or in the lateral direction (i.e., in the X direction), or combinations thereof. As such, as depicted in FIG. 2, each of the plurality of suspension members 3 may extend vertically (i.e., in the +/− Z direction) and partially wrap around a respective traction sheave segments 20, 22 within at least one groove 24*a*, 24*b*, of the respective traction sheave segments 20, 22, as discussed in greater detail herein.

Now referring to FIGS. 2-5, the traction sheave assembly 5*a* includes the motor 12, or actuator, the shaft 14, a collar 30, at least one spoke 36, at least one meshing gear 40, and the traction sheave segments 20, 22. The shaft 14 includes a distal end 26*a*, an opposite proximate end 26*b*, and an exterior surface 34. The proximate end 26*b* is in communication with the motor 12 to rotate the shaft 14 upon an actuation of the actuator. For example, the distal end of the shaft may be coupled to the motor 12, keyed to be received by an opening in the motor 12, and/or other mechanical attachments that one skilled in the art would understand and appreciate. The shaft 14 may further have a first portion 28*a* and a second portion 28*h* that are positioned between and extending between the distal end 26*a* and the proximate end 26*b*.

In the depicted embodiment, the shaft 14 is generally illustrated as a cylindrical shape with a diameter D. This is non-limiting and the shaft 14 may any shape including, without limitation, rectangular, hexagonal, octagonal, and the like. Further, in the depicted embodiment, the shaft 14 is generally illustrated as having a uniform thickness across its length. That is, the first portion 28*a* and the second portion 28*h* have a similar length and diameter D1. This is non-limiting and either the first portion 28*a* or the second portion 28*b* may have different lengths and/or may have different diameters. For example, the first portion 28*a* may have a greater length than the second portion 28*b*. In another example, the second portion 28*b* may have a greater diameter than the first portion 28*a* (e.g., the exterior surface 34 has varying diameters).

Further, in the depicted embodiment, the shaft 14 is generally illustrated as solid elongated member. This is non-limiting and the shaft 14 may include a bore that extends between the proximal end 26*b* and the distal end 26*a* (e.g., the length of the shaft 14), or may extend at and for discrete periods (e.g., intermittent) between the proximal end 26*b* and the distal end 26*a*. Further, the exterior surface 34 may include a plurality of bores, openings, and the like. As such, the exterior surface 34 may not be a smooth contour as depicted in FIGS. 2-5. Further, in some embodiments, the first portion 28*a* and the second portion 28*b* of the shaft 14 are not monolithically formed, but are instead attached or coupled to one another via at least one fastener to form a single, monolithic elongated member. The at least one fastener may include, without limitation, bolt and nut, screw, rivet, adhesive, epoxy, weld, and/or the like.

The shaft 14 may, in some embodiments, be formed from metal, such as steel, aluminum, iron, copper, lead, nickel, tin, titanium, brass, and zinc, and alloys thereof. In other embodiments, the shaft 14 may be formed from plastic, ceramic, or composite materials such as acrylonitrile butadiene styrene (ABS), polyethylene (PE), polypropylene (PP), polycarbonate (PC), poly-amide thermoplastic (PA)—known as nylon and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PITT, PFPE, TALC, MoS2 (Molybdenum Disulfide), graphite, and/or the like. The shaft 14 may be formed via traditional methods such as injection molding, casting, machining, via additive methods, and/or the like.

As used herein, the terms "additive methods" refer generally to manufacturing processes wherein successive layers of material(s) are provided on each other to "build-up," layer-by-layer, a three-dimensional component. The successive layers generally fuse together to form a monolithic component which may have a variety of integral subcomponents. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and lased ets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

For example, the material may be plastic, metal, concrete, ceramic, polymer, epoxy, photopolymer resin, or any other suitable material that may be in solid, liquid, powder, sheet material, wire, or any other suitable form. More specifically, according to embodiments of the present subject matter, the additive manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt base superalloys. These materials are examples of materials suitable for use in the additive manufacturing processes described herein.

Still referring to FIGS. 2-5, the first portion 28*a* and the second portion 28*b* are separated by a collar 30. In some embodiments, the collar 30 may be formed monolithically with the shaft 14. That is, the collar 30 may be formed with the shaft 14 via traditional methods such as injection molding, casting, machining, via additive methods, and/or the like. As such, the collar 30 may be formed during the same manufacturing process as the shaft 14 to form a single structure. In other embodiments, the collar 30 may be coupled or otherwise attached to the shaft 14. As such, the collar 30 may include an inner surface 32*a* and an opposite outer surface 32*b*. In some embodiments, the collar 30 may be coupled to or otherwise attached to the shaft 14 via a snap fit configuration. As such, the inner surface 32*a* of the collar 30 may engage with a predetermined portion of the exterior surface 34 of the shaft 14 to separate the first portion 28*a* and the second portion 28*b* of the shaft 14. That is, in this embodiment, the collar 30 includes a through bore defining the inner surface 32*a*, which has an inner diameter that is slightly larger than the diameter D1 of the exterior surface 34 of the shaft 14 to allow the collar 30 to be positioned in a predetermined position on the shaft 14.

In other embodiments, the collar 30 may be coupled or otherwise attached to the shaft 14 via a fastener. For example, the fastener may include, without limitation, a bolt and nut, screw, rivet, adhesive, epoxy, weld, and/or the like. As such, in this embodiment, the inner surface 32*a* is retained in contact with the exterior surface 34 of the shaft 14 via the fastener. That is, in this embodiment, the through bore of the collar 30 permits for the inner surface 32*a* of the collar to be positioned or aligned with a predetermined portion of the exterior surface 34 of the shaft 14 to secure, attach and/or couple the collar 30 at the predetermined position on the shaft 14.

The collar 30 may, in some embodiments, be formed from metal, such as steel, aluminum, iron, copper, lead, nickel, tin, titanium, brass, and zinc, and alloys thereof. In other embodiments, the collar 30 may be formed from plastic, ceramic, or composite materials such as acrylonitrile butadiene styrene (ABS), polyethylene (PE), polypropylene (PP), polycarbonate (PC), poly—amide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like.

At least one spoke 36 extends from the outer surface 32*b* of the collar 30. In the embodiments depicted best in FIG. 4, four spokes 38*a*, 38*b*, 38*c*, 38*d* extend from the outer surface 32*b* of the collar 30. Each of the four spokes 38*a*, 38*b*, 38*c*, 38*d* include a receiving end 46 positioned opposite of the collar 30. Each of the four spokes 38*a*, 38*b*, 38*c*, 38*d* are depicted as uniformly spaced apart and extending from the outer surface 32*b* of the collar 30 an equal distance or length. This is non-limiting and each of the four spokes 38*a*, 38*b*, 38*c*, 38*d* may be irregularly spaced and/or may extend an irregular distance or length from the outer surface 32*b* of the collar 30. Further, each of the four spokes 38*a*, 38*b*, 38*c*, 38*d* are depicted as generally cylindrical in shape with a symmetric outer circumference surface 39. This is non-limiting and each of the four spokes 38*a*, 38*b*, 38*c*, 38*d* may be other shapes, or combinations of other shapes, such as square, rectangular, hexagonal, spherical, octagonal, and the like. Further, each of the four spokes 38*a*, 38*b*, 38*c*, 38*d* may be irregularly shaped and/or each of the four spokes 38*a*, 38*b*, 38*c*, 38*d* may have a different shape from one another and/or the outer circumference surface 39 may be different between each of the four spokes 38*a*, 38*b*, 38*c*, 38*d*.

In some embodiments, each of the four spokes 38*a*, 38*b*, 38*c*, 38*d* may be formed monolithically with the collar 30. That is, each of the four spokes 38*a*, 38*b*, 38*c*, 38*d* may be formed with the collar 30 via traditional methods such as injection molding, casting, machining, via additive methods, and/or the like. As such, each of the four spokes 38*a*, 38*b*, 38*c*, 38*d* may be formed during the same manufacturing process as the collar 30 such that a single structure is formed.

In other embodiments, each of the four spokes 38*a*, 38*b*, 38*c*, 38*d* may be coupled or otherwise attached to the collar 30. As such, each of the four spokes 38*a*, 38*b*, 38*c*, 38*d* may include an adjoining end that abuts the outer surface 32*b* of the collar 30 and the receiving end 46. In some embodiments, each of the four spokes 38*a*, 38*b*, 38*c*, 38*d* may be coupled to or otherwise attached to the collar 30 via a snap fit configuration such that the adjoining end of each of the four spokes 38*a*, 38*b*, 38*c*, 38*d* is received by an opening in the outer surface 32*b* of the collar 30 in a snap fit configuration.

In other embodiments, each of the four spokes 38*a*, 38*b*, 38*c*, 38*d* may be coupled or otherwise attached to the collar 30 via a fastener. For example, the fastener may include, without limitation, a bolt and nut, screw, rivet, adhesive, epoxy, weld, and/or the like. As such, in this embodiment, the abutting surface of each of the four spokes 38*a*, 38*b*, 38*c*, 38*d* is retained in contact with the outer surface 32*b* of the collar 30 via the fastener. That is, in this embodiment, each of the four spokes 38*a*, 38*h*, 38*c*, 38*d* is positioned or aligned at predetermined position of the collar 30.

Still referring to FIGS. 2-5, at least one meshing gear 40 includes an aperture 42. The aperture 42 is configured to be positioned so to be received by the respective one of the at least one spoke 36 extending from the outer surface 32*b* of the collar 30. That is, the aperture 42 receives the receiving end 46 to position the at least one meshing gear 40 onto the at least one spoke 36. In the depicted embodiments, the at least one meshing gear 40 is four meshing gears 44*a*, 44*b*, 44*c*, 44*d* in which each include the aperture 42. Each of the apertures 42 of the four meshing gears 44*a*, 44*b*, 44*c*, 44*d* receives a respective one of the four spokes 38*a*, 38*b*, 38*c*, 38*d*. In some embodiments, each of the four meshing gears 44*a*, 44*h*, 44*c*, 44*d* are tapered with a plurality of teeth 45, or gears, circumferentially surrounding an exterior surface 48 of each of the four meshing gears 44*a*, 44*h*, 44*c*, 44*d*. As such, each of the four meshing gears 44*a*, 44*h*, 44*c*, 44*d* may be a spider gear type. In other embodiments, each of the four meshing gears 44*a*, 44*b*, 44*c*, 44*d* may be other gear types such as straight bevel gears, spiral bevel gears, helical gears, spur gears, and the like, and/or combinations thereof.

Still referring to FIGS. 2-5, the traction sheave segment 20 includes a terminating end 50*a* and an opposite gear end 50*b* with a bore 52 extending between the terminating end 50*a* and the gear end 50*b* to define an inner surface 54*a*. The traction sheave segment 20 includes an opposite outer surface 54*b* and the grooves 24*a* that circumferentially surrounds the outer surface 54*b*. In the depicted embodiment, there are three grooves 24*a*. Each of the three grooves 24*a* receive a different one of the plurality of suspension members 3. This is non-limiting and there may be more or less than three grooves 24*a*. This is non-limiting and there may be more or less than three grooves 24*a*.

The inner surface 54*a* includes at least one annular recess 58 positioned within the bore 52 between the gear end 50*b* and the terminating end 50*a*. The at least one annular recess 58 is configured to receive at least one bearing 60. In some embodiments, the at least one bearing 60 is coupled or attached to the traction sheave segment 20 via a snap fit with the at least one annular recess 58. In other embodiments, the at least one bearing 60 is coupled or attached to the traction sheave segment 20 via a fastener to position maintain positioning of the at least one bearing 60 within the at least one annular recess 58. Example fasteners include, without limitation, bolt and nut, screw, rivets, adhesive, weld, epoxy, and the like. In the depicted embodiments, there are two annular recesses 58, one adjacent to the gear end 50*b* and the other adjacent to the terminating end 50*a*. As such, in the depicted embodiments, there are two bearings 60, one for each of the two annular recesses 58.

The bore 52 is configured to receive the exterior surface 34 of the first portion 28*a* of the shaft 14. As such, the bore 52 has a diameter D2 that is larger than the diameter D1 of the exterior surface 34 of the shaft 14. Further, each of the two bearings 60 have an aperture 62 with a bearing diameter D3, which is a larger diameter than the diameter D1 of the exterior surface 34 of the shaft 14 to form a snap fit configuration attachment between each of the two bearings 60 and the shaft 14. As such, because the two bearings 60 are attached or coupled to the traction sheave segment 20, the shaft 14 is coupled to rotate or move within the aperture 62 of each of the two bearings 60.

In some embodiments, the gear end 50*b* may be a flange and may have a larger outer diameter D4 compared to an outer diameter D5 of the terminating end 50*a*. Further, in some embodiments, the terminating end 50*a* may further include a terminating face 66, which may have a smooth contour. The gear end 50*b* may include a gear face 68. In some embodiments, a sheave receiving gear 70 may be integrated into the gear face 68 and may include a plurality of teeth 72 that circumferentially surround the bore 52 and that are complementary to the plurality of teeth 45 of the four meshing gears 44*a*, 44*b*, 44*c*, 44*d* such that the sheave receiving gear 70 and the four meshing gears 44*a*, 44*b*, 44*c*, 44*d* engage and/or interact with one another. That is, in some embodiments, the receiving gear 70 may be machined or otherwise integrated into the gear face 68. In other embodiments, the sheave receiving gear 70 may be coupled or attached to the gear face 68 via fasteners. Example fasteners include, without limitation, nut and bolt, screw, rivets, adhesive, weld, epoxy, and the like. The sheave receiving gear 70 may be a straight bevel gear, spiral bevel gear, helical gear, spur gear, and the like, and/or combinations thereof.

As such, upon an actuation of the motor 12, or actuator, the shaft 14 rotates or moves, which moves the collar 30 and the each of the four spokes 38*a*, 38*b*, 38*c*, 38*d*. In turn, the each of the four meshing gears 44*a*, 44*b*, 44*c*, 44*d* may simultaneously move while engaging with the sheave receiving gear 70, which in turn may rotate or move the traction sheave segment 20 thereby driving those suspension members of the plurality of suspension members that are in contact with the grooves 24*a* of the traction sheave segment 20.

In some embodiments, the traction sheave segment 20 may be formed via traditional methods such as injection molding, casting, machining, via additive methods, and/or the like. As such, the traction sheave segment 20 may be formed from metal, such as steel, aluminum, iron, copper, lead, nickel, tin, titanium, brass, and zinc, and alloys thereof. In other embodiments, the traction sheave segment 20 may be formed from plastic, ceramic, or composite materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonatelacrylonitrile butadiene styrene, polyurethane, polymethyl methacrylate, high density polyethylene, low density polyethylene, polystyrene, PEEK, POM (Acetal/

Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like.

Still referring to FIGS. 2-5, the traction sheave segment 22 includes a terminating end 74*a* and an opposite gear end 74*b* with a bore 76 extending between the terminating end 74*a* and the gear end 74*h* to define an inner surface 78*a*. The traction sheave segment 22 includes an opposite outer surface 78*h* and the grooves 24*b* that circumferentially surrounds the outer surface 78*b*. In the depicted embodiment, there are three grooves 24*b*. This is non-limiting and there may be more or less than three grooves 24*h*. Each of the three grooves 24*b* receive a different one of the plurality of suspension members 3. This is non-limiting and there may be more or less than three grooves 24*b*.

The inner surface 78*a* includes at least one annular recess 82 positioned within the bore 76 between the gear end 74*b* and the terminating end 74*a*. The at least one annular recess 82 is configured to receive at least one bearing 84. In some embodiments, the at least one bearing 84 is coupled or attached to the traction sheave segment 22 via a snap fit with the at least one annular recess 82. In other embodiments, the at least one bearing 84 is coupled or attached to the traction sheave segment 22 via a fastener to position maintain positioning of the at least one bearing 84 within the at least one annular recess 82. Example fasteners include, without limitation, bolt and nut, screw, rivets, adhesive, weld, epoxy, and the like. In the depicted embodiments, there are two annular recesses 82, one adjacent to the gear end 74*b* and the other adjacent to the terminating end 74*a*. As such, in the depicted embodiments, there are two bearings 84, one for each of the two annular recesses 82.

The bore 52 is configured to receive the exterior surface 34 of the first portion 28*a* of the shaft 14. As such, the bore 76 has a diameter D6 that is larger than the diameter D1 of the exterior surface 34 of the shaft 14. Further, each of the two bearings 84 have an aperture 86 with a bearing diameter D7, which is a larger diameter than the diameter D1 of the exterior surface 34 of the shaft 14 to form a snap fit configuration attachment between each of the two bearings 84 and the shaft 14. As such, because the two bearings 84 are attached or coupled to the traction sheave segment 22, the shaft 14 is coupled to rotate or move within the aperture 86 of each of the two bearings 84.

In some embodiments, the gear end 74*b* may be a flange and may have a larger outer diameter D8 compared to an outer diameter D9 of the terminating end 74*a*. Further, in some embodiments, the terminating end 74*a* may further include a terminating face 88, which may have a smooth contour. The gear end 74*b* may include a gear face 90. In some embodiments, a sheave receiving gear 92 may be integrated into the gear face 90 and may include a plurality of teeth 94 that circumferentially surround the bore 76 and that are complementary to the plurality of teeth 45 of the four meshing gears 44*a*, 44*b*, 44*c*, 44*d* such that the sheave receiving gear 92 and the four meshing gears 44*a*, 44*b*, 44*c*, 44*d* engage and/or interact with one another. That is, in some embodiments, the receiving gear 92 may be machined or otherwise integrated into the gear face 90. In other embodiments, the sheave receiving gear 92 may be coupled or attached to the gear face 90 via fasteners. Example fasteners include, without limitation, nut and bolt, screw, rivets, adhesive, weld, epoxy, and the like. The sheave receiving gear 92 may be a straight bevel gear, spiral bevel gear, helical gear, spur gear, and the like, and/or combinations thereof.

As such, upon an actuation of the motor 12, or actuator, the shaft 14 rotates or moves, which moves the collar 30 and the each of the four spokes 38*a*, 38*b*, 38*c*, 38*d*. In turn, the each of the four meshing gears 44*a*, 44*b*, 44*c*, 44*d* may simultaneously move while engaging with the sheave receiving gear 92, which in turn may rotate or move the traction sheave segment 22 thereby driving those suspension members of the plurality of suspension members 3 that are in contact with the grooves 24*b* of the traction sheave segment 22.

In some embodiments, the traction sheave segment 22 may be formed via traditional methods such as injection molding, casting, machining, via additive methods, and/or the like. As such, the traction sheave segment 22 may be formed from metal, such as steel, aluminum, iron, copper, lead, nickel, tin, titanium, brass, and zinc, and alloys thereof. In other embodiments, the traction sheave segment 22 may be formed from plastic, ceramic, or composite materials such as acrylonitrile butadiene styrene (ABS), polyethylene (PE), polypropylene (PP), polycarbonate (PC), polyamide thermoplastic (PA)—known as nylon—and variations of nylon including PA6 and PA66, Polyphthalamide (PPA), polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, theremoplastic vulcanizate, polysulfone, and/or the like, and combinations thereof. Additionally, additives may be added such as UV absorbers, flame retardants, colorants, glass fibers, plasticizers, carbon fiber, aramid fiber, glass bead, PTFE, PFPE, TALC, MoS2 (Molybdenum Disulfide), graphite, and/or the like.

Still referring to FIGS. 2-5, in operation, upon the actuation of the motor 12, or actuator, the shaft 14 rotates or moves, which moves the collar 30 and the each of the four spokes 38*a*, 38*b*, 38*c*, 38*d*. In turn, the each of the four meshing gears 44*a*, 44*b*, 44*c*, 44*d* may simultaneously move while engaging with both the sheave receiving gear 70 and the sheave receiving gear 92. The sheave receiving gear 70 in turn may rotate or move the traction sheave segment 20 while the sheave receiving gear 92 may rotate or move the traction sheave segment 22. In turn, the traction sheave segment 20 drives the suspension members of the plurality of suspension members 3 that are in contact with the grooves 24*a* of the traction sheave segment 20 and the traction sheave segment 22 the suspension members of the plurality of suspension members 3 that are in contact with the grooves 24*b* of the traction sheave segment 22.

As such, the traction sheave segment 20 and the traction sheave segment 22 rotate independently relative to one another to have a motion independent from one another when the shaft 14 is rotated thereby equalizing a tension from the suspension members of the plurality of suspension members 3 in contact with the traction sheave segment 20 and separately a tension from the other suspension members of the plurality of suspension members 3 in contact with the traction sheave segment 22. Further, the traction sheave segment 20 and the traction sheave segment 22 may rotate about a common rotational axis.

It should be understood that the independent rotation between the traction sheave segment 20 and the traction sheave segment 22 splits the torque generated by the motor 12 transferred to the shaft 14 allowing each of the traction sheave segment 20 and the traction sheave segment 22 to rotate or move at different speeds. This permits for the equalizing of the tension between the suspension members of the plurality of suspension members 3 in contact with the traction sheave segment 20 and the other suspension members of the plurality of suspension members 3 in contact with the traction sheave segment 22. The tension difference may be caused by friction, geometrical variations between the different grooves 24*a* of the traction sheave segment 20 and separately, or independently, geometrical variations between the different grooves 24*b* of the traction sheave segment 22 (e.g., differences in geometrical sizes for machining tolerances for different grooves and from traction sheave to traction sheave).

The independent motion or relative movement or motion between the traction sheave segment 20 and the traction sheave segment 22 causes tension to be reduced one or more suspension members of the plurality of suspension members 3. That is, the independent rotation between the traction sheave segment 20 and the traction sheave segment 22 permit tensions in the plurality of suspension members 3 to equalize. As such, the arrangement of the embodiments described herein permit for the traction sheave segment 20 and the traction sheave segment 22 to remain mechanically related to each other that allows the transmission of torque to the elevator assembly 1 as needed to drive the elevator cab 2.

It should be appreciated that there may be more than the traction sheave segment 20 and the traction sheave segment 22, such as, without limitation, one additional traction sheave segment, two or more additional traction sheave segments, three or more, and so on. Each of the additional tractions sheave segments may be mechanically coupled via additional collars, spokes, and meshing gears.

It should now be understood that described above is an improved traction sheave assembly in elevator assemblies that includes components for independent movable traction sheave segments to permit relative motion between each of the movable traction sheave segments to equalize a tension of different suspension members in contact with each of the movable traction sheave segments. Further, the independent movable traction sheave segments discussed herein permit the independent traction sheave segments to turn independently from one another as needed while still being mechanically related to each other such that a transmission of torque to the elevator system is permitted to drive or move an elevator cab.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A traction sheave assembly comprising:

an actuator;

a shaft having a distal end and a proximate end, the proximate end in communication with the actuator to rotate the shaft upon an actuation of the actuator, the shaft further having a first portion and a second portion positioned between the distal end and the proximate end and separated by a collar, at least one spoke extending from an outer surface of the collar;

at least one meshing gear received by a respective one of the at least one spoke extending from the outer surface of the collar;

a first sheave segment positioned to receive the first portion of the shaft, the first sheave segment having a first sheave receiving gear that engages with the at least one meshing gear; and a second sheave segment positioned to receive the second portion of the shaft, the second sheave segment having a second sheave receiving gear that engages with the at least one meshing gear, wherein the first sheave segment and the second sheave segment rotate independently relative to one another when the shaft is rotated thereby permitting an equalizing of a tension from at least one suspension member.

2. The traction sheave assembly of claim 1, wherein:

the first sheave segment has a first terminating end and an opposite first gear end, the first sheave receiving gear is integrated into the first gear end; and the second sheave segment has a second terminating end and an opposite second gear end, the second sheave receiving gear integrated into the second gear end.

3. The traction sheave assembly of claim 2, wherein the first gear end has a larger outer diameter than the first terminating end and the second gear end has a larger outer diameter than the second terminating end.

4. The traction sheave assembly of claim 2, wherein:

the first sheave segment includes at least one annular recess positioned between the first gear end and the first terminating end and is configured to receive at least one first bearing; and the second sheave segment includes at least one annular recess positioned between the second gear end and the second terminating end and is configured to receive at least one second bearing.

5. The traction sheave assembly of claim 1, wherein the at least one spoke is four spokes uniformly spaced apart and that each extend from the outer surface of the collar.

6. The traction sheave assembly of claim 5, wherein each of the four spokes receive a respective one of the at least one meshing gear to each simultaneously engage with the first sheave receiving gear and the second sheave receiving gear.

7. The traction sheave assembly of claim 1, wherein each of the at least one meshing gear include an aperture to receive the at least one spoke.

8. The traction sheave assembly of claim 1, wherein the at least one meshing gear is a spider gear.

9. A traction sheave assembly for equalizing a tension of a plurality of suspension members of an elevator assembly, the elevator assembly further having an elevator cab positioned within a hoistway, the plurality of suspension members move the elevator cab between a plurality of positions within the hoistway between the plurality of positions, the traction sheave assembly comprising:

a motor;

a shaft having a distal end and a proximate end, the proximate end in communication with the motor to rotate the shaft upon an actuation of the motor, the shaft further having a first portion and a second portion positioned between the distal end and the proximate end and separated by a collar, at least one spoke extending from an outer surface of the collar;

at least one meshing gear received by a respective one of the at least one spoke extending from the outer surface of the collar;

a first sheave segment positioned to receive the first portion of the shaft, the first sheave segment having a first sheave receiving gear that engages with the at least one meshing gear; and a second sheave segment positioned to receive the second portion of the shaft, the second sheave segment having a second sheave receiving gear that simultaneously engages with the at least one meshing gear, wherein the first sheave segment and the second sheave segment rotate independently relative to one another when the shaft is rotated thereby equalizing a tension between at least one of the plurality of suspension members and the remaining plurality of suspension members.

10. The traction sheave assembly of claim 9, wherein:

the first sheave segment has a first terminating end and an opposite first gear end, the first sheave receiving gear is integrated into the first gear end; and the second sheave segment has a second terminating end and an opposite second gear end, the second sheave receiving gear integrated into the second gear end.

11. The traction sheave assembly of claim 10, wherein the first gear end has a larger outer diameter than the first terminating end and the second gear end has a larger outer diameter than the second terminating end.

12. The traction sheave assembly of claim 10, wherein:

the first sheave segment includes at least one annular recess positioned between the first gear end and the first terminating end and is configured to receive at least one first bearing; and the second sheave segment includes at least one annular recess positioned between the second gear end and the second terminating end and is configured to receive at least one second bearing.

13. The traction sheave assembly of claim 9, wherein the at least one spoke is four spokes uniformly spaced apart and that each extend from the outer surface of the collar.

14. The traction sheave assembly of claim 13, wherein each of the four spokes receive a respective one of the at least one meshing gear to each simultaneously engage with the first sheave receiving gear and the second sheave receiving gear.

15. The traction sheave assembly of claim 9, wherein each of the at least one meshing gear include an aperture to receive the at least one spoke.

16. The traction sheave assembly of claim 9, wherein the at least one meshing gear is a spider gear.

17. A traction sheave assembly for an elevator assembly having at least two suspension members, the traction sheave assembly comprising:

an actuator;

a shaft having a distal end and a proximate end, the proximate end in communication with the actuator to rotate the shaft upon an actuation of the actuator, the shaft further having a first portion and a second portion positioned between the distal end and the proximate end and separated by a collar, at least one spoke extending from an outer surface of the collar;

at least one meshing gear received by a respective one of the at least one spoke extending from the outer surface of the collar;

a first sheave segment positioned to receive the first portion of the shaft, the first sheave segment having a first sheave receiving gear that engages with the at least one meshing gear and at least one groove positioned within an exterior surface that receives one suspension member of the at least two suspension members, the first sheave segment having a first terminating end and an opposite first gear end, the first sheave receiving gear is integrated into the first gear end, the first sheave segment further having at least one annular recess positioned between the first gear end and the first terminating end and is configured to receive at least one first bearing; and a second sheave segment positioned to receive the second portion of the shaft, the second sheave segment having a second sheave receiving gear that engages with the at least one meshing gear and at least one groove positioned within an exterior surface that receives the other one suspension member of the at least two suspension members, the second sheave segment has a second terminating end and an opposite second gear end, the second sheave receiving gear integrated into the second gear end, the second sheave segment further having at least one annular recess positioned between the second gear end and the second terminating end and is configured to receive at least one second bearing, wherein the first sheave segment and the second sheave segment rotate independently relative to one another when the shaft is rotated thereby equalizing a tension from at the one suspension member in contact with the first sheave segment and a tension from at the other one suspension member in contact with the second sheave segment.

18. The traction sheave assembly of claim 17, wherein:

the at least one spoke is four spokes uniformly spaced apart and that each extend from the outer surface of the collar; and each of the four spokes receive a respective one of the at least one meshing gear to each simultaneously engage with the first sheave receiving gear and the second sheave receiving gear.

19. The traction sheave assembly of claim 17, wherein each of the at least one meshing gear include an aperture to receive the at least one spoke.

20. The traction sheave assembly of claim 17, wherein the first gear end has a larger outer diameter than the first terminating end and the second gear end has a larger outer diameter than the second terminating end.

* * * * *